US009817566B1

(12) United States Patent
Silvis et al.

(10) Patent No.: US 9,817,566 B1
(45) Date of Patent: Nov. 14, 2017

(54) APPROACHES TO MANAGING DEVICE FUNCTIONALITY

(71) Applicant: Amazon Technologies, Inc., Reno, NV (US)

(72) Inventors: Jason Glenn Silvis, Bellevue, WA (US); Shweta Dattatraya Grampurohit, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 139 days.

(21) Appl. No.: 13/706,113

(22) Filed: Dec. 5, 2012

(51) Int. Cl.
*G06F 3/041* (2006.01)
*G06F 3/0488* (2013.01)

(52) U.S. Cl.
CPC .................. *G06F 3/0488* (2013.01)

(58) Field of Classification Search
CPC .. G06F 3/04842; G06F 3/04886; H04M 1/22; H04M 2250/22
USPC .......................................... 345/156, 173–184
See application file for complete search history.

(56) References Cited

U.S. PATENT DOCUMENTS

| 2006/0109271 | A1* | 5/2006 | Lomask | G06T 11/206 345/440 |
| 2007/0247441 | A1* | 10/2007 | Kim et al. | 345/173 |
| 2009/0207148 | A1* | 8/2009 | Sugimoto | G06F 3/0418 345/173 |
| 2009/0322695 | A1* | 12/2009 | Cho | G06F 3/0416 345/173 |
| 2010/0333027 | A1* | 12/2010 | Martensson et al. | 715/833 |
| 2012/0054688 | A1* | 3/2012 | Ohki et al. | 715/838 |

* cited by examiner

*Primary Examiner* — Insa Sadio
(74) *Attorney, Agent, or Firm* — Polsinelli LLP

(57) ABSTRACT

Various embodiments provide a graphical interface element displayable on a touch screen of a computing device associated with a function to be performed. In response to receiving a touch input from a finger of a user to an area associated with the graphical interface element, such as a tap, the function is performed. In response to receiving a touch input to the area associated with the user selectable element followed by a swipe, drag, or movement of the user selectable element with a finger of the user, the user is able to control an amount of the function to be performed.

8 Claims, 8 Drawing Sheets

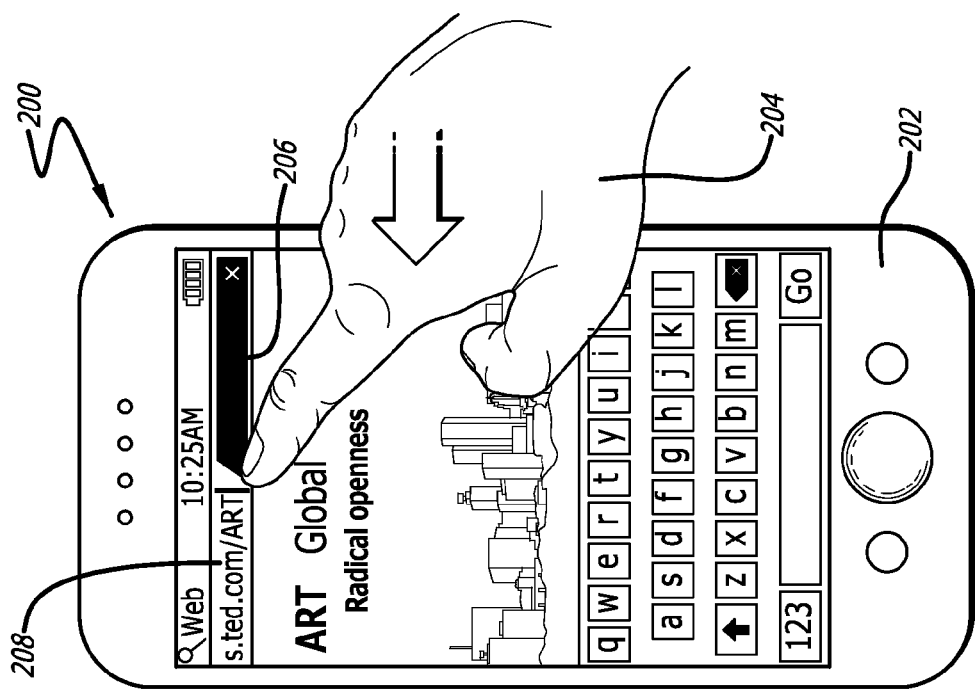
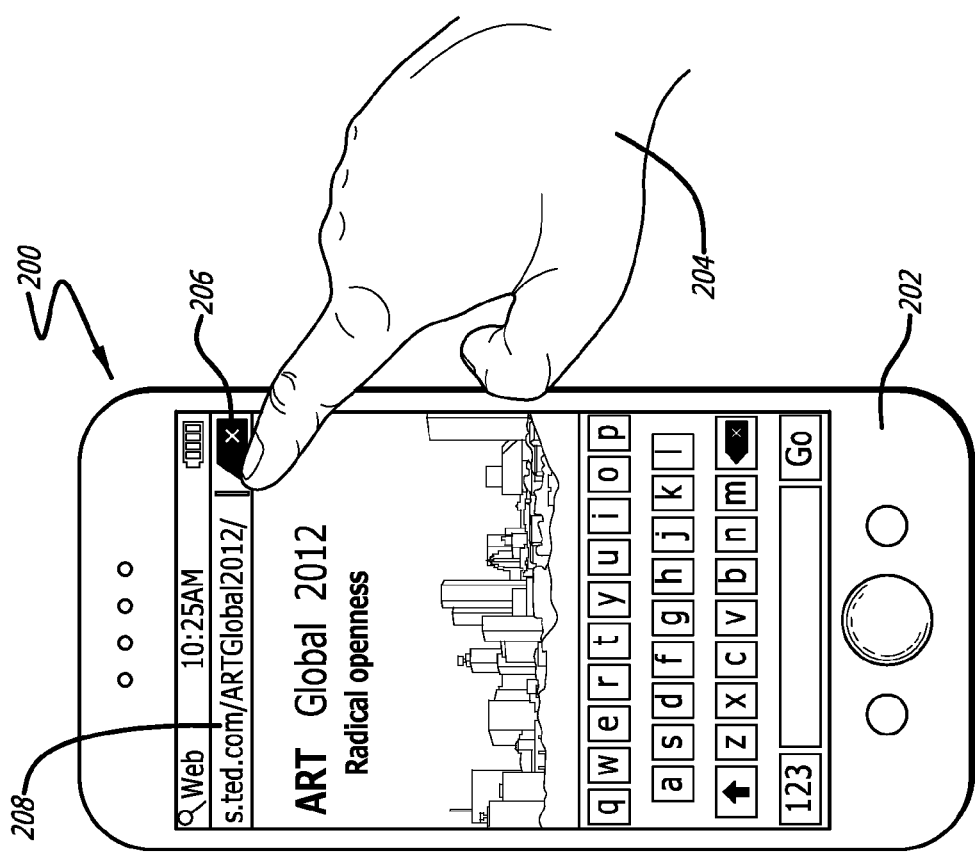

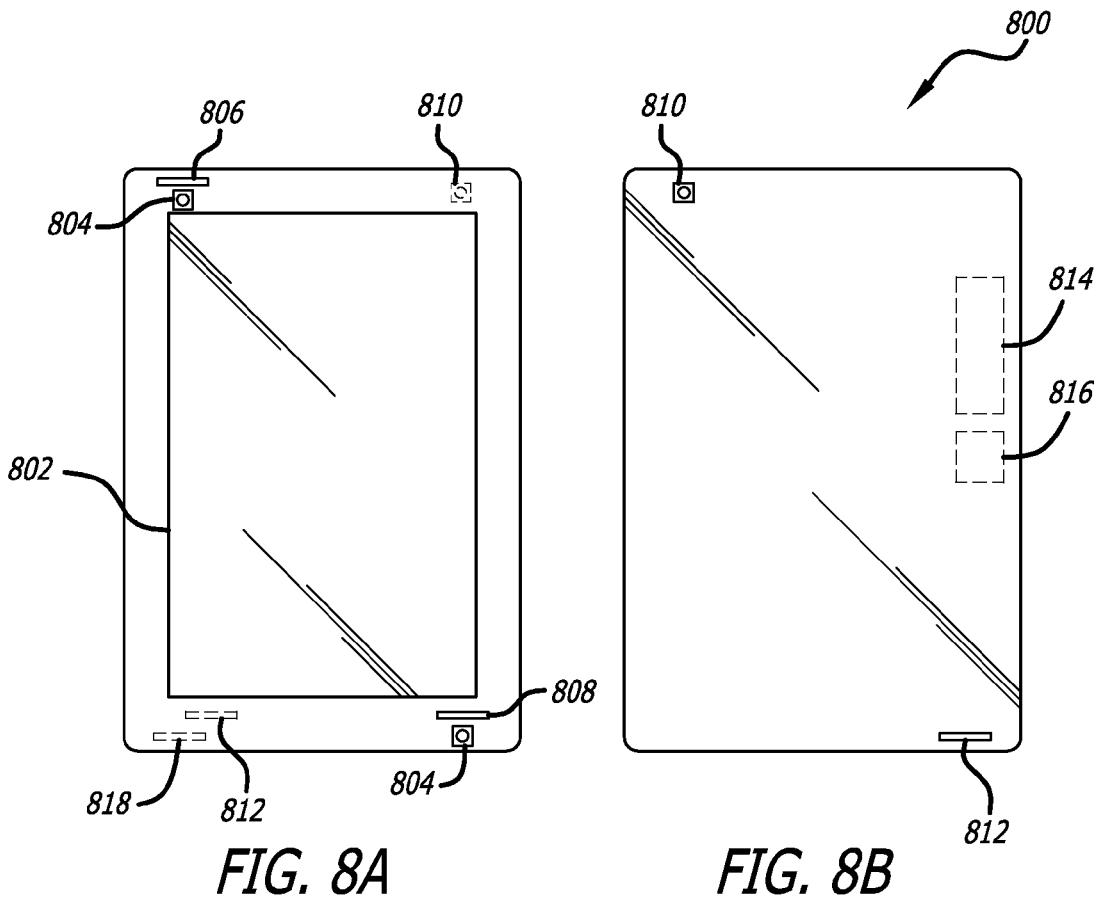
FIG. 8A
FIG. 8B
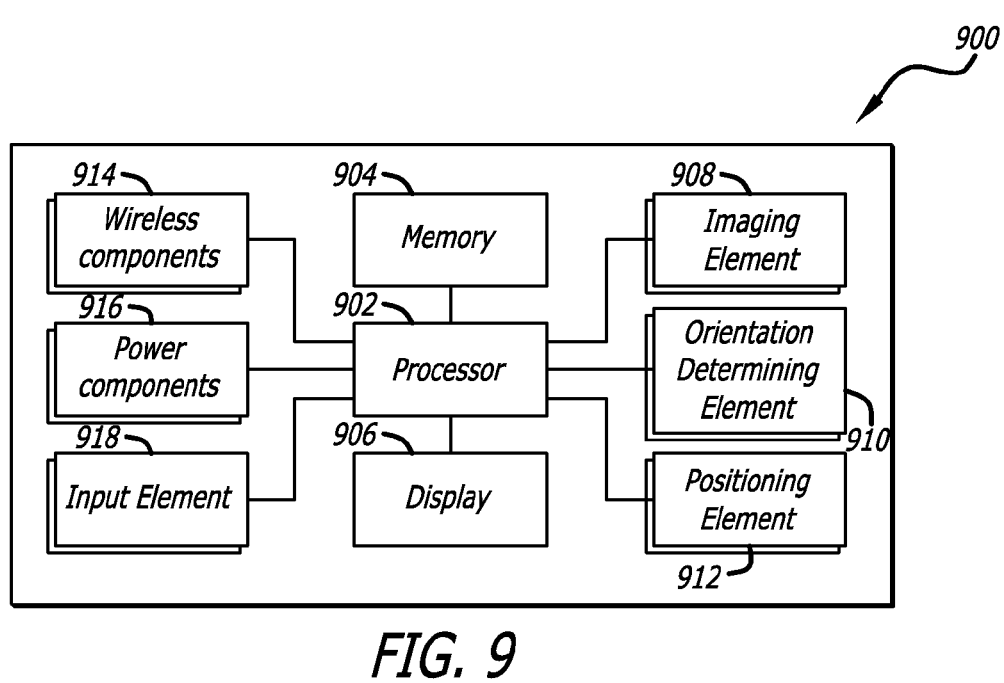
FIG. 9

APPROACHES TO MANAGING DEVICE FUNCTIONALITY

BACKGROUND

Users are increasingly relying upon various electronic and computing devices to store, track, and update various types of information and handle various types of tasks. For example, many users rely upon computing devices to store contact information, user schedules, task lists, search the web, write messages, and other such information. Unfortunately, for portable computing devices, such as smart phones or tablet computers, the screen size can be limited such that it can be cumbersome for users to input at least some of the above-mentioned data due to the size of the various input fields or elements relative to the size of a user's finger. One conventional approach that is particularly cumbersome is deleting a portion of text in an input or text editing field. For example, conventional approaches have offered users control of an insert point by either moving the insert point with a finger or by using a backspace button. Moving the insert point with a finger is particularly cumbersome with a touch keyboard making it often an ordeal to position the insert point in a desired position on a small touch displays, particularly if the user has thick fingers. Further, in order to delete all text in an entire text field, conventional approaches have enabled users to tap a delete button to perform the action, which has appeared as a cross icon. As technology advances and as people are increasingly using portable computing devices in a wider variety of ways, it can be advantageous to adapt the ways in which various input features are presented to users and the ways in which users interact with the same.

BRIEF DESCRIPTION OF THE DRAWINGS

Various embodiments in accordance with the present disclosure will be described with reference to the drawings, in which:

FIGS. 2A and 2B illustrate another example situation of a user providing input to a computing device in accordance with at least one embodiment;

FIGS. 8A and 8B illustrate an example computing device that can be used to implement aspects of various embodiments;

FIG. 9 illustrates example components that can be used with a device such as that illustrated in FIGS. 8A and 8B.

DETAILED DESCRIPTION

Figure 1:
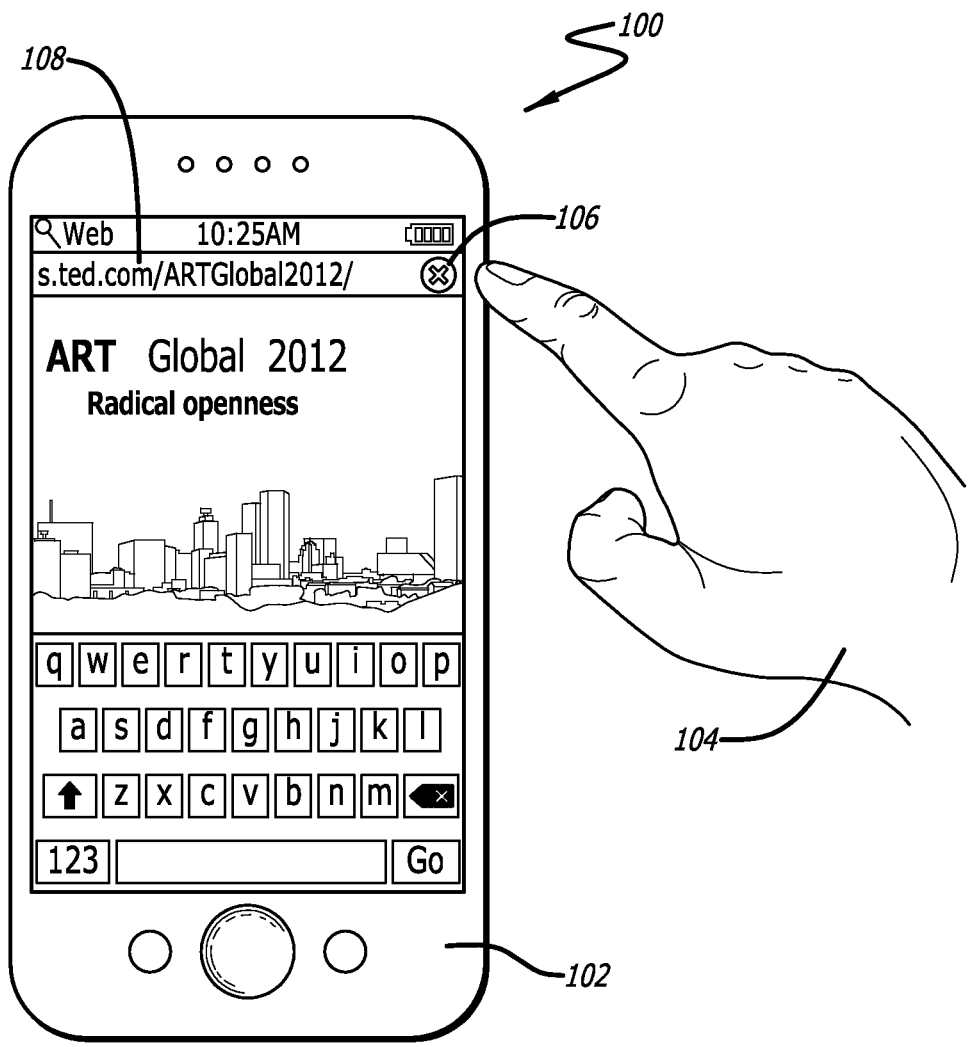
FIG. 1 illustrates an example situation of a user providing input to a computing device in accordance with at least one embodiment.

Systems and methods in accordance with various embodiments of the present disclosure may overcome one or more of the aforementioned and other deficiencies experienced in conventional approaches to enabling a user to interact with a computing device. In particular, various approaches provide a graphical interface element displayable on a touch display of a computing device associated with a function to be performed. In response to receiving a finger tap to an area associated with the graphical interface element, the function is performed. In response to receiving a touch to the area associated with the graphical interface element followed by a swipe, drag, or lateral movement of the graphical interface element, a user is able to control an amount of the function to be performed. For example, a text field including a line of text, such as a string of alphanumeric characters, therein is provided for display on a touch display. The text field is associated with a virtual delete text button that, when selected, deletes all the text within the field. In addition, a user may stretch or drag the button by providing a touch input to the area associated with the button and a lateral swipe, while maintaining contact between the user's finger and the touch display, to designate a portion of the text to be deleted by stretching or dragging the button over the portion of text. In at least one embodiment, the user can delete the designated portion upon removing contact between the user's finger and the touch display, at which point, any text covered by or under the stretched button is deleted. In an alternative embodiment, the text may simply be deleted by moving the button over the text in a manner similar to an eraser deleting chalk on a chalkboard.

In various embodiments, other buttons or command elements could perform like functions while exhibiting like behavior, as described above. A tap, or other touch gesture, can act as a trigger to perform a base function. Other gestures or motions, such as a swipe or drag as described above, can enable a tunable degree of the base function, or secondary function, to be performed by a respective button. The secondary function, as described above with respect to a text editing field, could be to delete a subset of the text where the base function is to delete all of the text in the field. In another example, the base function of a button could be to skip a song or track playing through a media player application and the secondary function could be to fast-forward within the song or track. Alternatively, the secondary function could be to skip multiple tracks in a play list. For example, a user could stretch or drag the button down or across a row or column of songs in a playlist to select a desired track. In another example, the function could be associated with building a table in a word processing document application or a spreadsheet application. The base function of the button could be to add a single row or column with each selection of the button and the secondary function could enable a user to stretch or drag the button to build a table by inserting multiple rows or columns. Other applications and application control buttons could also be used within the scope of various embodiments.

Various other functions and advantages are described and suggested below as may be provided in accordance with the various embodiments.

FIG. 1 illustrates an example situation 100 of a user 104 viewing a mobile web browser displayed on a computing device 102 that can be used in accordance with various embodiments. Although a portable computing device (e.g., a smart phone, an electronic book reader, or tablet computer) is shown, it should be understood that various other types of electronic device that are capable of determining and processing input can be used in accordance with various embodiments discussed herein. These devices can include, for example, notebook computers, personal data assistants, controllers, and portable media players, among others. In this example, the user 104 is shown about to select a conventional delete text button 106. In conventional computing devices, providing touch input to an area associated with the delete text button 106 simply clears all text in a text edit field 108, as shown in FIG. 1. If a user wants to delete a subset or only a portion of the text, a user must tap their finger on the text edit field 108 to reveal an insert point, which is then movable and enables a user to select the desired portion or remove it by using a backspace button. Moving the insert point with a finger is cumbersome and it is often an ordeal to position the insert point in a desired position on a small touch display, particularly if the user has thick fingers. An alternative approach is, therefore, desirable.

FIG. 2 illustrates an alternative approach that can be used in accordance with various embodiments. FIG. 2 illustrates an example situation 200 where a user 204 is viewing a mobile web browser displayed on a computing device 202. In this example, the mobile web browser includes a text editing field 208 including a string of alphanumeric characters for a Uniform Resource Locator (URL), and a virtual delete button or text deletion element 206. In various embodiments, the text deletion element 206 is an image or rendering displayed on a touch display of a computing device. The area on the touch display associated with the text deletion element 206 is selectable by a finger of the user 204 to initiate a function. In this example, the base function of the delete button 206 is a clear text function to remove the URL, or other text within the text editing field 208, such as a search string, when the user 204 provides a tap or touch selection to the area/region on a touch display associated therewith. Further, the text deletion element 206, in this example, includes a secondary function that enables the user 204 to delete a subset of the URL, or other text within the text editing field 208. In this example, the user 204 is shown stretching (dragging, moving, sliding, etc.) the text deletion element 206 across the text editing field 208 in order to delete a portion of the text. Further, the user 204 could continue to stretch the text deletion element 206 all the way across the text editing field 208 to delete all the text therein. This operation, as well as additional features and functionality, is elaborated on with respect to FIG. 3.

Figure 3A:
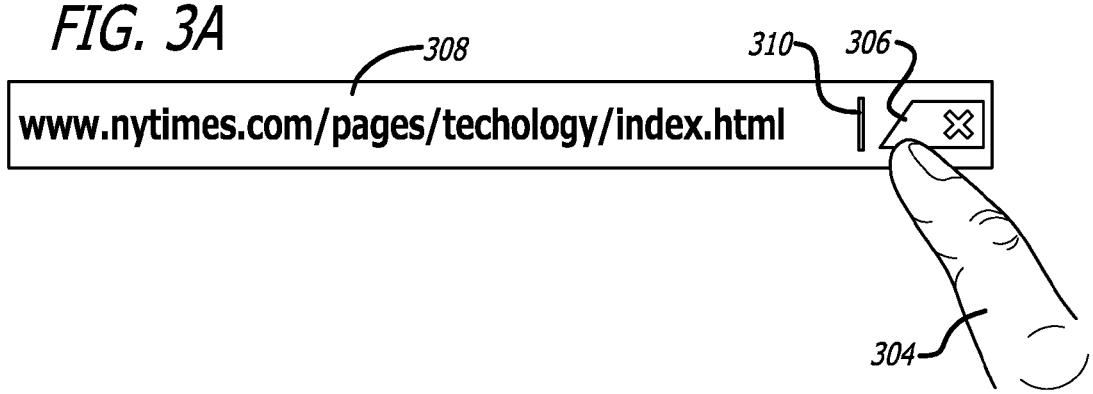
FIGS. 3A, 3B, 3C, and 3D illustrate an example operation performed by a touch gesture on a computing device in accordance with at least one embodiment.
Figure 3B:
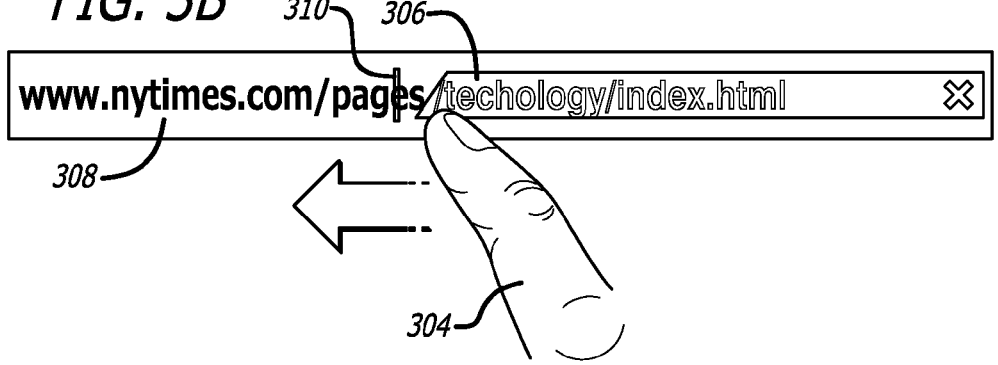
Figure 3C:
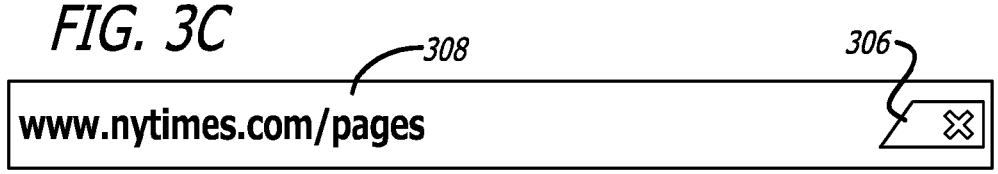
Figure 3D:
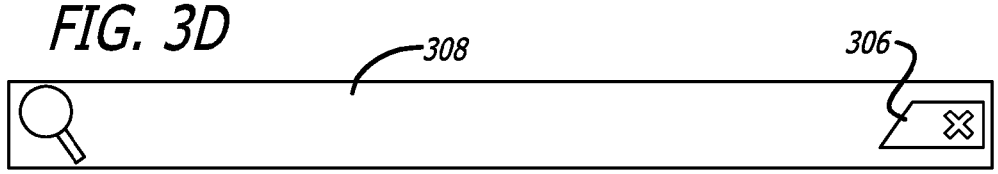

FIGS. 3A-3D illustrate an example implementation of a text deletion element that can be used in accordance with various embodiments. FIGS. 3A-3D each illustrate an example text edit field 308 (with a URL for the nytimes.com/pages/technology/index.html therein) of a web browser, a delete text button 306 at a far end of the edit field 308, and a user 304 interacting therewith. In this example, FIG. 3A shows the user 304 touching the delete button 306 and maintaining contact therewith in order to slide or stretch the button 306 to delete at least a portion of the URL. In this example, a text insert point 310 is shown ahead of, and movable with, the delete text button 306 to provide the user 304 with a visual placement queue for inserting new text. As discussed above, the delete button 306 can stretch, move, slide, and the like from a respective location at an end of the text edit field 308 to delete text including all the text or subset thereof. Accordingly, FIG. 3B illustrates the user 304 sliding the delete button 306 from the right side of the text edit field 308 to the left. In this example, the delete button 306 is translucent or transparent enabling the user to view the text underneath. Alternatively, instead of appearing translucent, the delete button 306 could remove text characters as upon encountering the same thereby acting as an eraser. Further, an animation could be associated with removal of the letters, such as a distortion of each character to appear as if each character were being sucked up by a vacuum. Therefore, in this example, the user 304 touches the delete button 306 and makes a lateral movement with their finger across the touch display in order to designate the portion to be deleted by, in this example, covering the portion of the URL with the button 306. In this example, the delete button 306 is an indicator of a portion of the text string to be deleted, which corresponds to a location of the finger within the text edit field 308, such as how far the user's finger is from the default location of the delete button 306. In this example, the user 304 has stretched the button 306 such that the insert point 310 is just after "pages" in the URL. In order to delete the designated portion of the URL, the text after "pages," in this example, the user 304 removes their finger from contact with the touch display. In at least one embodiment, the delete button snaps back, removing all text along the way, in an animation like a rubber band. Further, this animation could also include an animated bounce back affect at or near the button's default at rest location at the end of the text edit field 308. FIG. 3C, in this example, illustrates the after effect of the user 304 stretching the delete button 306 over the portion of the URL and, subsequently, removing (or releasing) contact with the touch display thereby deleting text of the URL after "pages." Additionally, as mentioned elsewhere herein, the user 304 can tap or otherwise touch the delete button 306 to completely remove or delete all text of the URL, or other text within the edit field 308, in accordance with at least one embodiment. The result of this action, along with stretching the delete button 306 across the length of the text edit field 308, are shown in FIG. 3D. The text delete button 306 is, therefore, similar to a backspace button, but instead of pressing or tapping the button to remove text by backing up or erasing text with an insert point, the user 304 moves the button to a delete location, after which all text will be removed, at a rate or speed associated with the user's finger. Various other approaches can be used as well as discussed or suggested elsewhere herein.

Figure 4A:
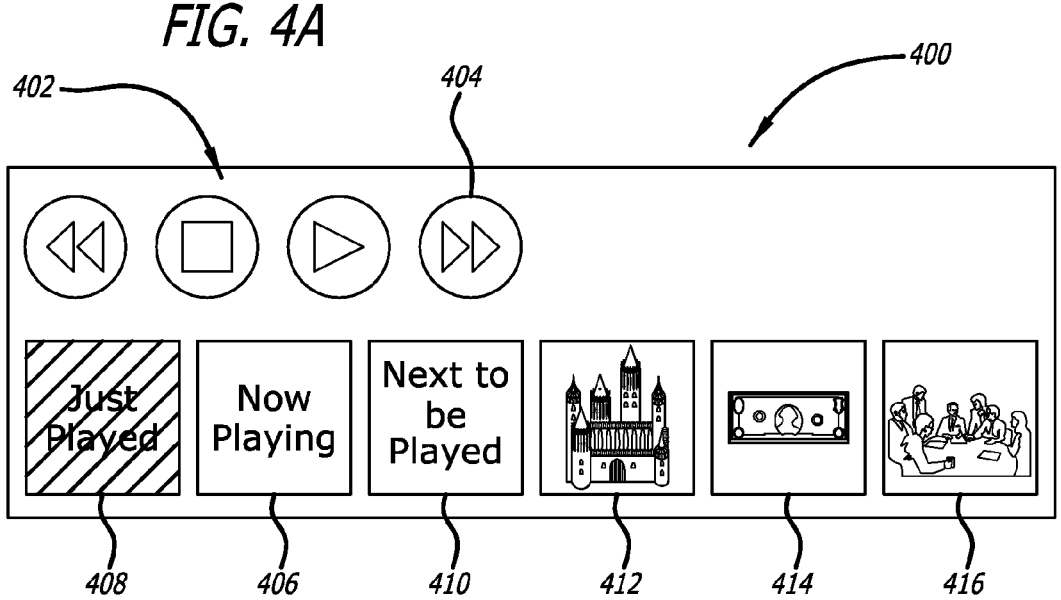
FIGS. 4A and 4B illustrate an example operation performed by a touch gesture on a computing device in accordance with at least one embodiment.
Figure 4B:
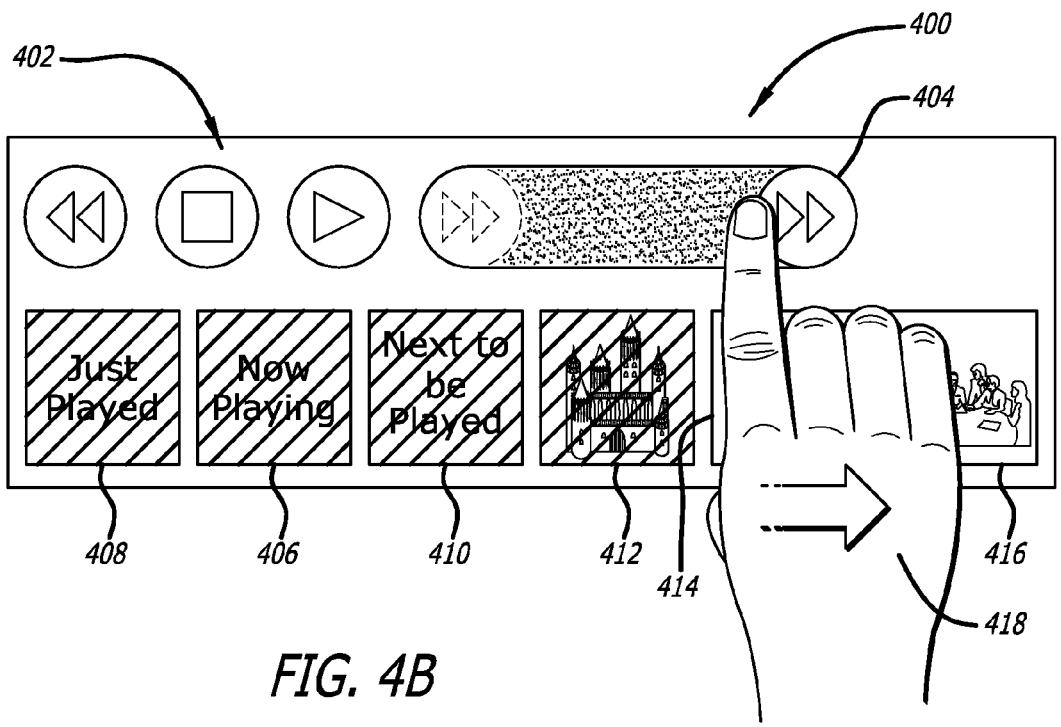

FIGS. 4A-4B illustrate another example implementation that can be used in accordance with various embodiments. In this example, FIGS. 4A-4B illustrate a media player 400 playing a music track 406 as part of a playlist. In this example, the media player 400 includes play controls 402, an advance button 404, and music tracks 406-416 of the playlist. In this example, the user has recently listened to track 408, is currently listening to track 406, and will hear track 410 next. The user can select the advance button 404 to seek to, or play, the next track. Typically, however, such an advance button, in conventional media players, has been limited to only seeking or advancing one track at a time. In accordance with at least one embodiment, the advance button 404 can enable a user 418 to seek to any track in a playlist or presently being provided for display, such as that shown by media player 400, by stretching the advance button 404 to a location of a desired track. In this example, FIG. 4B shows a user 418 stretching the advance button 404 to an advance location associated with music track 414 and thereby skipping track 410 and track 412. Alternatively, instead of advancing songs within a playlist, the advance button 404 could be used to fast forward within the currently playing track 406. In this example, the back button could also be used as a reverse or rewind feature. Various other approaches and applications can be used as well as discussed or suggested elsewhere herein.

Figure 5A:
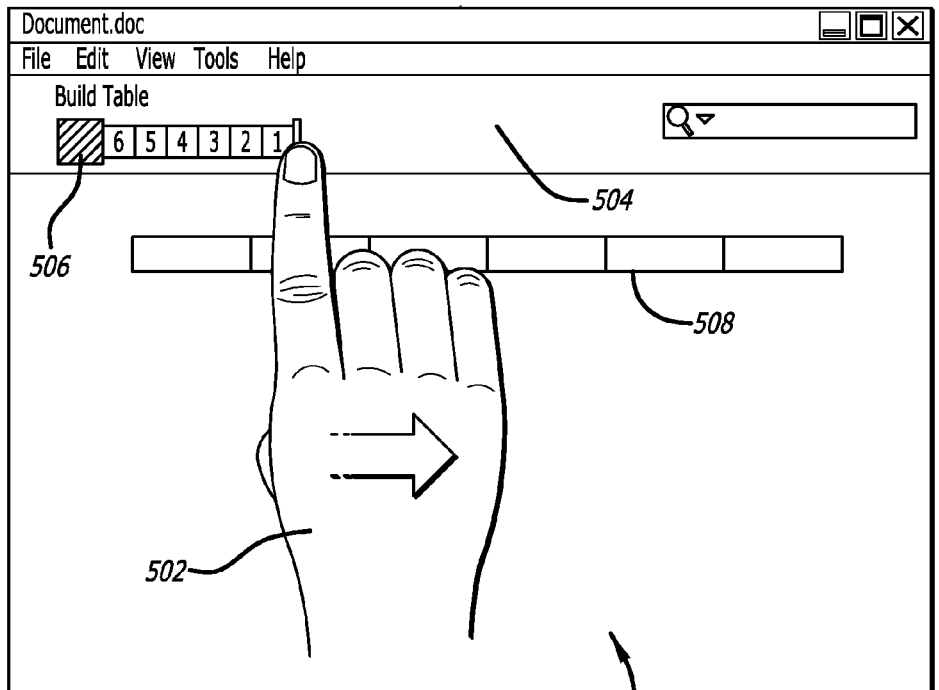
FIGS. 5A and 5B illustrate an example operation performed by a touch gesture on a computing device in accordance with at least one embodiment.
Figure 5B:
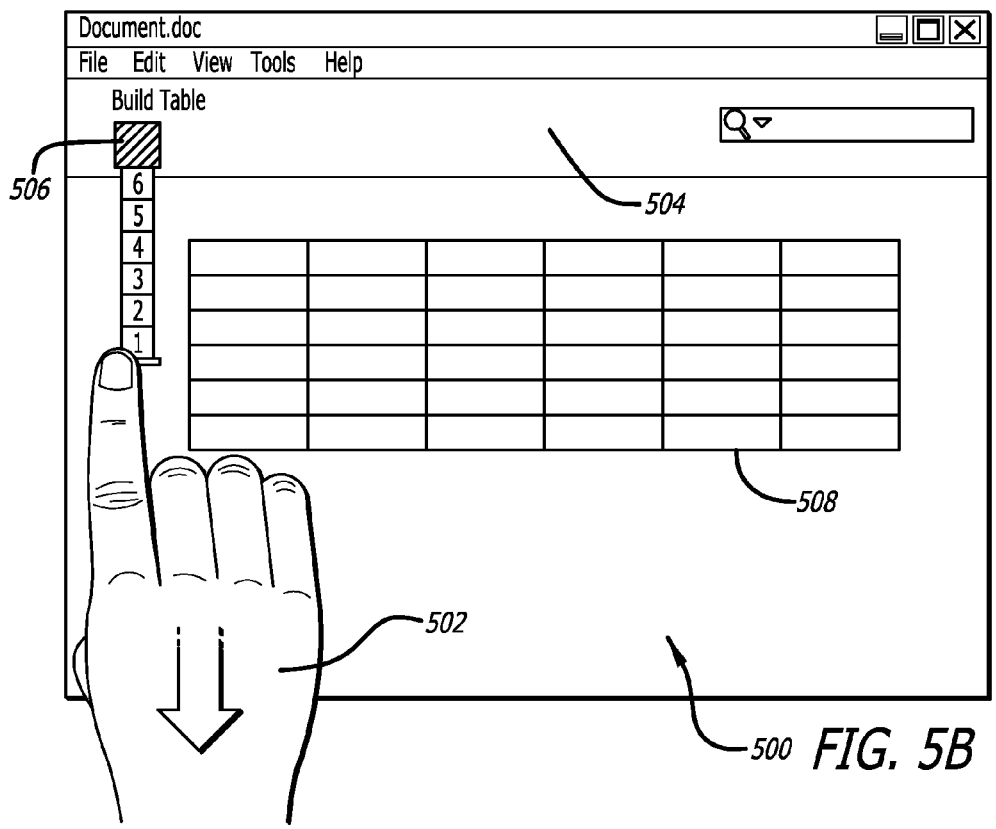

FIGS. 5A-5B illustrate another example implementation 500 that can be used in accordance with various embodiments. In this example, FIGS. 5A-5B illustrate a user 502 building a table in a word processing document 504. In this example, FIG. 5A illustrates the user designating a number of columns 508 for the table by stretching or dragging a build table button 506 horizontally on a touch display. In this example, the more the user 502 moves their finger across the touch display, the more columns 508 are added to the table. Likewise, the user 502 can stretch the build table button 506 vertically (or downward) on a touch display to designate the number of rows, as shown in FIG. 5B. Accordingly, once the user 502 releases their finger upon a number or rows or columns, the word processing application will build a table with the respective number of rows or columns. Additionally, as the user releases their finger from contact with the touch display, the build table button 506 could recoil in an animation to appear as if it is being shot back like a rubber band or other like animation or effect. Various other approaches and applications can be used as well as discussed or suggested elsewhere herein.

Figure 6:
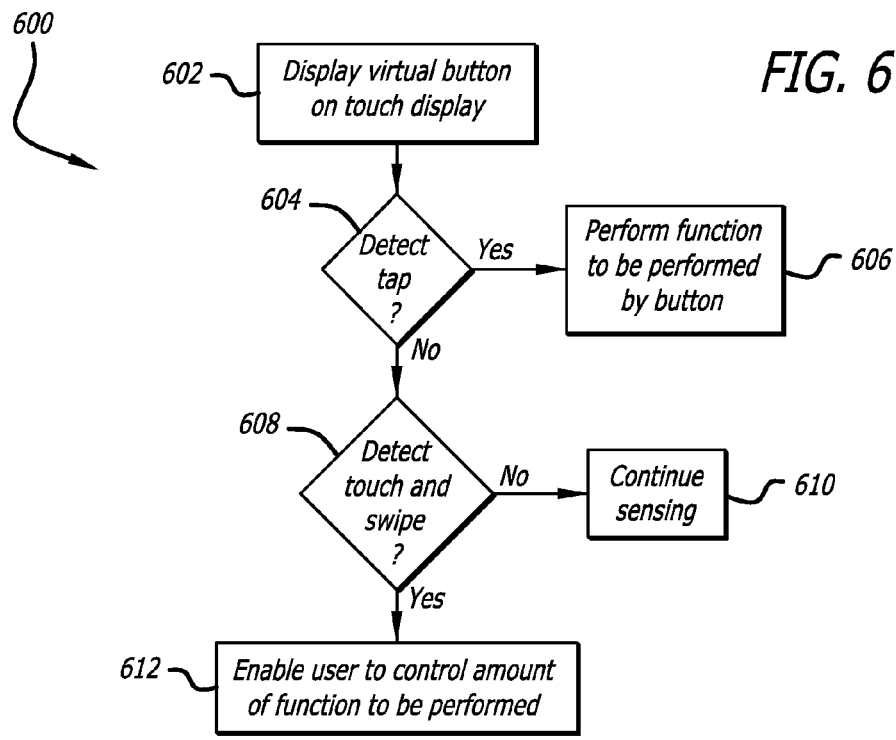
FIG. 6 illustrates an example process for an operation to be performed by a touch gesture on a computing device that can be used in accordance with at least one embodiment.

FIG. 6 illustrates an example process 600 for enabling various degrees of functionality to be performed based on a type of gesture received by a computing device that can be used in accordance with various embodiments. It should be understood that, for any process discussed herein, there can be additional, fewer, or alternative steps performed in similar or alternative orders, or in parallel, within the scope of the various embodiments unless otherwise stated. In at least some embodiments, a button of an interface associated with a function to be performed on a computing device is displayed to a user 602. Upon detecting a touch input, the device attempts to determine what type of gesture was provided thereto. In this example, if the computing device detects a tap associated with a location of the button on a touch display of the computing device 604, the function associated with the button is performed 606. If the touch input is a touch and swipe 608, the computing device enables the user to control an amount or a degree of the function associated with the graphical interface element 612. In at least one example, controlling an amount of the function includes enabling the user move a control implement, such as one or more fingers, a stylus, and the like, from an area of a touch display associated with the button while maintaining contact with the touch display. As the user moves their finger, the appearance of button could change by appearing to stretch from the area associated with the button to a location of the finger on the touch display. If the touch input is not recognized, however, the computing device continues in a sensing mode 610. In one example, the function to be performed is associated with a media player, as described above. In another example, the function to be performed is associated with building a table within a word processing document. Various other applications that include controls for various functions are also applicable and may make use of the teachings within the scope of various embodiments.

Figure 7:
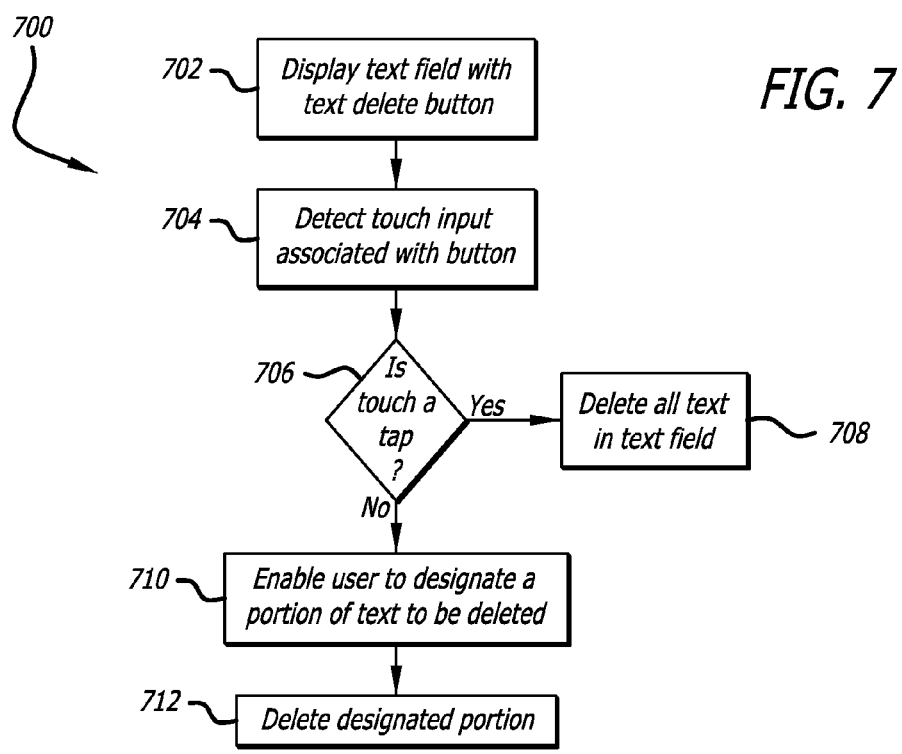
FIG. 7 illustrates another example process for an operation to be performed by a touch gesture on a computing device that can be used in accordance with at least one embodiment.

FIG. 7 illustrates an example process 700 for enabling various degrees of functionality to be performed based on a type of gesture received by a computing device that can be used in accordance with various embodiments. It should be understood that, for any process discussed herein, there can be additional, fewer, or alternative steps performed in similar or alternative orders, or in parallel, within the scope of the various embodiments unless otherwise stated. In at least some embodiments, a text field with text therein is displayed on a touch display 702. In one example, the text edit field can be associated a web browser for a mobile computing device. The text edit field, in this example, includes a delete text button. In this example, a touch input to an area of the touch display associated with the delete text button is detected 704. When the touch input is a tap 706, all text within the text edit field is deleted or cleared 708. When the touch input is not a tap, but a touch including a lateral swipe of the delete button 706, the computing device enables a user to designate a portion of the text to be deleted 710. In this example, the touch and lateral swipe includes the user touching the area of the touch display associated with the delete text button with a finger and maintaining contact with the touch display while swiping laterally to designate the portion of text. In at least one embodiment, this may be rendered to appear as if the user is dragging the button from a right side of the text editing field. The delete text button, in this example, may stretch or elongate in appearance from the area of the touch display associated with the delete text button to a current location of the finger as the user swipes laterally and maintains contact with the touch display. In this example, when the user release contact between their finger and the touch display, the designated portion of the text is deleted 712. Various other approaches can be used as well as discussed or suggested elsewhere herein.

In at least one embodiment, a clutch could be provided to unlock at least some features of a virtual button described herein. For example, the delete text button could be dedicated to clearing text in one state, then, upon receiving a clutch, such as selection of an additional input, the delete text button could change states enabling a user to slide and move the delete text button to delete a portion of the text. In another example, providing the clutch could prevent the button from removing text until a specific input is received. For example, the clutch could enable the button to perform the duties of a sliding insert point or cursor within a text field. In this example, the button could be solid or opaque in a default mode where movement of the button deletes text as it is encountered. Then, upon receiving a clutch input, the button could become translucent enabling the user to see text beneath the button and to move the insert point associated therewith for selecting or designating text for deletion. Then, upon receiving another clutch input, the selected or designated text could be deleted. The user may also tap a location within the text edit field in order to place the insert point in a desired location. Various other approaches can be used as well as discussed or suggested elsewhere herein.

FIGS. 8A and 8B illustrate front and back views, respectively, of an example electronic computing device 800 that can be used in accordance with various embodiments. Although a portable computing device (e.g., a smartphone, an electronic book reader, or tablet computer) is shown, it should be understood that any device capable of receiving and processing input can be used in accordance with various embodiments discussed herein. The devices can include, for example, desktop computers, notebook computers, electronic book readers, personal data assistants, cellular phones, video gaming consoles or controllers, television set top boxes, and portable media players, among others.

In this example, the computing device 800 has a display screen 802 (e.g., an LCD element) operable to display information or image content to one or more users or viewers of the device. The display screen of some embodiments displays information to the viewers facing the display screen (e.g., on the same side of the computing device as the display screen). The computing device in this example can include one or more imaging elements, in this example including two image capture elements 804 on the front of the device and at least one image capture element 810 on the back of the device. It should be understood, however, that image capture elements could also, or alternatively, be placed on the sides or corners of the device, and that there can be any appropriate number of capture elements of similar or different types. Each image capture element 804 and 810 may be, for example, a camera, a charge-coupled device (CCD), a motion detection sensor or an infrared sensor, or other image capturing technology.

As discussed, the device can use the images (e.g., still or video) captured from the imaging elements 804 and 810 to generate a three-dimensional simulation of the surrounding environment (e.g., a virtual reality of the surrounding environment for display on the display element of the device). Further, the device can utilize outputs from at least one of the image capture elements 804 and 810 to assist in determining the location and/or orientation of a user and in recognizing nearby persons, objects, or locations. For example, if the user is holding the device, the captured image information can be analyzed (e.g., using mapping information about a particular area) to determine the approximate location and/or orientation of the user. The captured image information may also be analyzed to recognize nearby persons, objects, or locations (e.g., by matching parameters or elements from the mapping information).

The computing device can also include at least one microphone or other audio capture elements capable of capturing audio data, such as words spoken by a user of the device, music being hummed by a person near the device, or audio being generated by a nearby speaker or other such component, although audio elements are not required in at least some devices. In this example there are three microphones, one microphone 808 on the front side, one microphone 812 on the back, and one microphone 806 on or near a top or side of the device. In some devices there may be only one microphone, while in other devices there might be at least one microphone on each side and/or corner of the device, or in other appropriate locations.

The device 800 in this example also includes one or more orientation- or position-determining elements 818 operable to provide information such as a position, direction, motion, or orientation of the device. These elements can include, for example, accelerometers, inertial sensors, electronic gyroscopes, and electronic compasses.

The example device also includes at least one communication mechanism 814, such as may include at least one wired or wireless component operable to communicate with one or more electronic devices. The device also includes a power system 816, such as may include a battery operable to be recharged through conventional plug-in approaches, or through other approaches such as capacitive charging through proximity with a power mat or other such device. Various other elements and/or combinations are possible as well within the scope of various embodiments.

FIG. 9 illustrates a set of basic components of an electronic computing device 800 such as the device 800 described with respect to FIG. 8. In this example, the device includes at least one processing unit 902 for executing instructions that can be stored in a memory device or element 904. As would be apparent to one of ordinary skill in the art, the device can include many types of memory, data storage, or computer-readable media, such as a first data storage for program instructions for execution by the processing unit(s) 902, the same or separate storage can be used for images or data, a removable memory can be available for sharing information with other devices, and any number of communication approaches can be available for sharing with other devices.

The device typically will include some type of display element 906, such as a touch screen, electronic ink (e-ink), organic light emitting diode (OLED) or liquid crystal display (LCD), although devices such as portable media players might convey information via other means, such as through audio speakers.

As discussed, the device in many embodiments will include at least one imaging element 908, such as one or more cameras that are able to capture images of the surrounding environment and that are able to image a user, people, or objects in the vicinity of the device. The image capture element can include any appropriate technology, such as a CCD image capture element having a sufficient resolution, focal range, and viewable area to capture an image of the user when the user is operating the device. Methods for capturing images using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device.

The example computing device 900 also includes at least one orientation determining element 910 able to determine and/or detect orientation and/or movement of the device. Such an element can include, for example, an accelerometer or gyroscope operable to detect movement (e.g., rotational movement, angular displacement, tilt, position, orientation, motion along a non-linear path, etc.) of the device 900. An orientation determining element can also include an electronic or digital compass, which can indicate a direction (e.g., north or south) in which the device is determined to be pointing (e.g., with respect to a primary axis or other such aspect).

As discussed, the device in many embodiments will include at least a positioning element 912 for determining a location of the device (or the user of the device). A positioning element can include or comprise a GPS or similar location-determining elements operable to determine relative coordinates for a position of the device. As mentioned above, positioning elements may include wireless access points, base stations, etc. that may either broadcast location information or enable triangulation of signals to determine the location of the device. Other positioning elements may include QR codes, barcodes, RFID tags, NFC tags, etc. that enable the device to detect and receive location information or identifiers that enable the device to obtain the location information (e.g., by mapping the identifiers to a corresponding location). Various embodiments can include one or more such elements in any appropriate combination.

As mentioned above, some embodiments use the element(s) to track the location of a device. Upon determining an initial position of a device (e.g., using GPS), the device of some embodiments may keep track of the location of the device by using the element(s), or in some instances, by using the orientation determining element(s) as mentioned above, or a combination thereof. As should be understood, the algorithms or mechanisms used for determining a position and/or orientation can depend at least in part upon the selection of elements available to the device.

The example device also includes one or more wireless components 914 operable to communicate with one or more electronic devices within a communication range of the particular wireless channel. The wireless channel can be any appropriate channel used to enable devices to communicate wirelessly, such as Bluetooth, cellular, NFC, or Wi-Fi channels. It should be understood that the device can have one or more conventional wired communications connections as known in the art.

The device also includes a power system 916, such as may include a battery operable to be recharged through conventional plug-in approaches, or through other approaches such as capacitive charging through proximity with a power mat or other such device. Various other elements and/or combinations are possible as well within the scope of various embodiments.

In some embodiments the device can include at least one additional input device 918 able to receive conventional input from a user. This conventional input can include, for example, a push button, touch pad, touch screen, wheel, joystick, keyboard, mouse, keypad, or any other such device or element whereby a user can input a command to the device. These I/O devices could even be connected by a wireless infrared or Bluetooth or other link as well in some embodiments. Some devices also can include a microphone or other audio capture element that accepts voice or other audio commands. For example, a device might not include any buttons at all, but might be controlled only through a combination of visual and audio commands, such that a user can control the device without having to be in contact with the device.

In some embodiments, a device can include the ability to activate and/or deactivate detection and/or command modes, such as when receiving a command from a user or an application, or retrying to determine an audio input or video input, etc. In some embodiments, a device can include an infrared detector or motion sensor, for example, which can be used to activate one or more detection modes. For example, a device might not attempt to detect or communicate with devices when there is not a user in the room. If an infrared detector (i.e., a detector with one-pixel resolution that detects changes in state) detects a user entering the room, for example, the device can activate a detection or control mode such that the device can be ready when needed by the user, but conserve power and resources when a user is not nearby.

A computing device, in accordance with various embodiments, may include a light-detecting element that is able to determine whether the device is exposed to ambient light or is in relative or complete darkness. Such an element can be beneficial in a number of ways. In certain conventional devices, a light-detecting element is used to determine when a user is holding a cell phone up to the user's face (causing the light-detecting element to be substantially shielded from the ambient light), which can trigger an action such as the display element of the phone to temporarily shut off (since the user cannot see the display element while holding the device to the user's ear). The light-detecting element could be used in conjunction with information from other elements to adjust the functionality of the device. For example, if the device is unable to detect a user's view location and a user is not holding the device but the device is exposed to ambient light, the device might determine that it has likely been set down by the user and might turn off the display element and disable certain functionality. If the device is unable to detect a user's view location, a user is not holding the device and the device is further not exposed to ambient light, the device might determine that the device has been placed in a bag or other compartment that is likely inaccessible to the user and thus might turn off or disable additional features that might otherwise have been available. In some embodiments, a user must either be looking at the device, holding the device or have the device out in the light in order to activate certain functionality of the device. In other embodiments, the device may include a display element that can operate in different modes, such as reflective (for bright situations) and emissive (for dark situations). Based on the detected light, the device may change modes.

Using the microphone, the device can disable other features for reasons substantially unrelated to power savings. For example, the device can use voice recognition to determine people near the device, such as children, and can disable or enable features, such as Internet access or parental controls, based thereon. Further, the device can analyze recorded noise to attempt to determine an environment, such as whether the device is in a car or on a plane, and that determination can help to decide which features to enable/disable or which actions are taken based upon other inputs. If voice recognition is used, words can be used as input, either directly spoken to the device or indirectly as picked up through conversation. For example, if the device determines that it is in a car, facing the user and detects a word such as "hungry" or "eat," then the device might turn on the display element and display information for nearby restaurants, etc. A user can have the option of turning off voice recording and conversation monitoring for privacy and other such purposes.

In some of the above examples, the actions taken by the device relate to deactivating certain functionality for purposes of reducing power consumption. It should be understood, however, that actions can correspond to other functions that can adjust similar and other potential issues with use of the device. For example, certain functions, such as requesting Web page content, searching for content on a hard drive and opening various applications, can take a certain amount of time to complete. For devices with limited resources, or that have heavy usage, a number of such operations occurring at the same time can cause the device to slow down or even lock up, which can lead to inefficiencies, degrade the user experience and potentially use more power.

In order to address at least some of these and other such issues, approaches in accordance with various embodiments can also utilize information such as user gaze direction to activate resources that are likely to be used in order to spread out the need for processing capacity, memory space and other such resources.

In some embodiments, the device can have sufficient processing capability, and the imaging element and associated analytical algorithm(s) may be sensitive enough to distinguish between the motion of the device, motion of a user's head, motion of the user's eyes and other such motions, based on the captured images alone. In other embodiments, such as where it may be desirable for the process to utilize a fairly simple imaging element and analysis approach, it can be desirable to include at least one orientation determining element that is able to determine a current orientation of the device. In one example, the at least one orientation determining element is at least one single- or multi-axis accelerometer that is able to detect factors such as three-dimensional position of the device and the magnitude and direction of movement of the device, as well as vibration, shock, etc. Methods for using elements such as accelerometers to determine orientation or movement of a device are also known in the art and will not be discussed herein in detail. Other elements for detecting orientation and/or movement can be used as well within the scope of various embodiments for use as the orientation determining element. When the input from an accelerometer or similar element is used along with the input from the camera, the relative movement can be more accurately interpreted, allowing for a more precise input and/or a less complex image analysis algorithm.

When using an imaging element of the computing device to detect motion of the device and/or user, for example, the computing device can use the background in the images to determine movement. For example, if a user holds the device at a fixed orientation (e.g. distance, angle, etc.) to the user and the user changes orientation to the surrounding environment, analyzing an image of the user alone will not result in detecting a change in an orientation of the device. Rather, in some embodiments, the computing device can still detect movement of the device by recognizing the changes in the background imagery behind the user. So, for example, if an object (e.g. a window, picture, tree, bush, building, car, etc.) moves to the left or right in the image, the device can determine that the device has changed orientation, even though the orientation of the device with respect to the user has not changed. In other embodiments, the device may detect that the user has moved with respect to the device and adjust accordingly. For example, if the user tilts their head to the left or right with respect to the device, the content rendered on the display element may likewise tilt to keep the content in orientation with the user.

Figure 10:
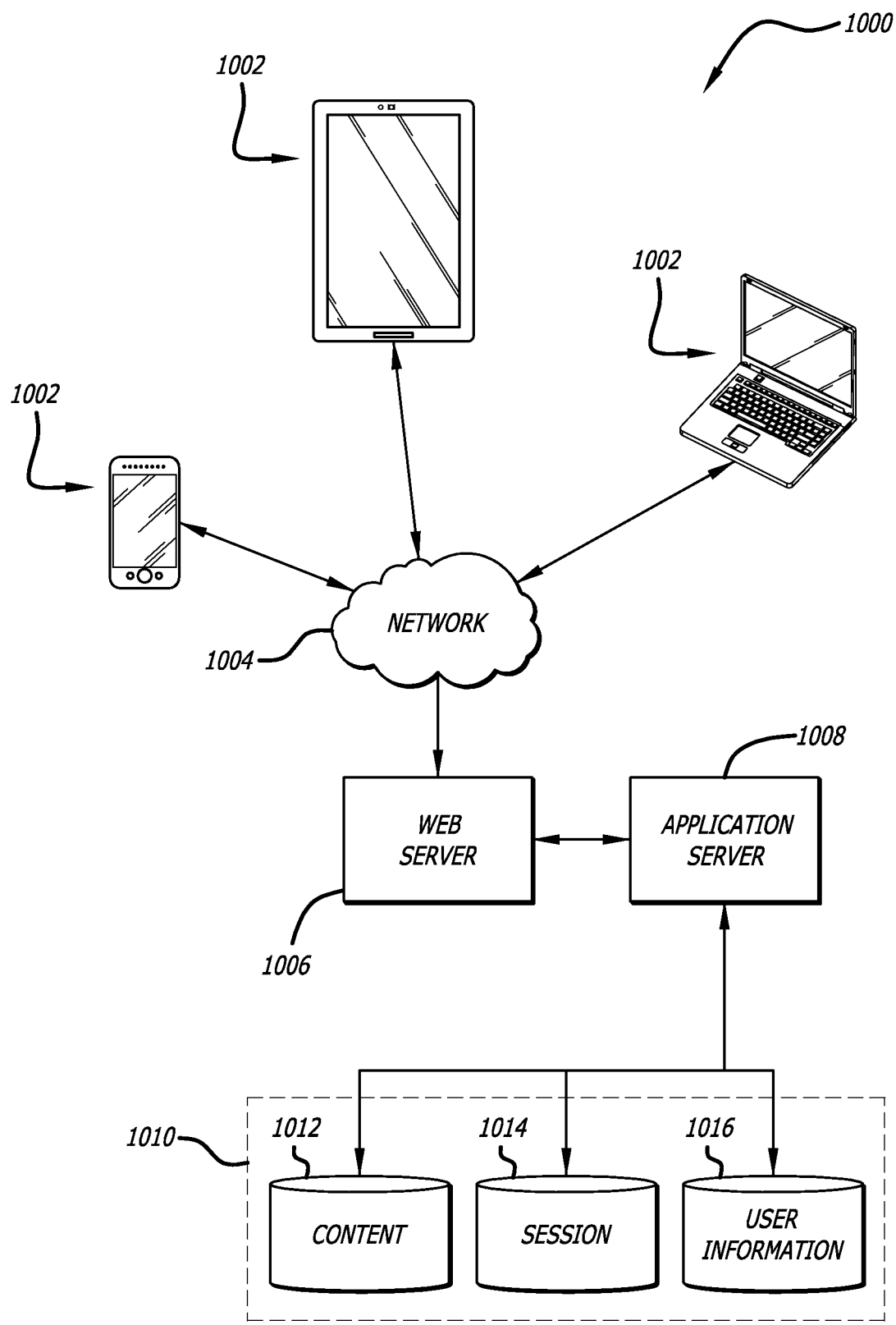
FIG. 10 illustrates an environment in which various embodiments can be implemented.

As discussed, different approaches can be implemented in various environments in accordance with the described embodiments. For example, FIG. 10 illustrates an example of an environment 900 for implementing aspects in accordance with various embodiments. As will be appreciated, although a Web-based environment is used for purposes of explanation, different environments may be used, as appropriate, to implement various embodiments. The system includes an electronic client device 1002, which can include any appropriate device operable to send and receive requests, messages or information over an appropriate network 1004 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. The network could be a "push" network, a "pull" network, or a combination thereof. In a "push" network, one or more of the servers push out data to the client device. In a "pull" network, one or more of the servers send data to the client device upon request for the data by the client device. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 1006 for receiving requests and serving content in response thereto, although for other networks, an alternative device serving a similar purpose could be used, as would be apparent to one of ordinary skill in the art.

The illustrative environment includes at least one application server 1008 and a data store 1010. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 1008 can include any appropriate hardware and software for integrating with the data store 1010 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 1006 in the form of HTML, XML or another appropriate structured language in this example. The handling of all requests and responses, as well as the delivery of content between the client device 1002 and the application server 1008, can be handled by the Web server 1006. It should be understood that the Web and application servers are not required and are merely example components, as structured code discussed herein can be executed on any appropriate device or host machine as discussed elsewhere herein.

The data store 1010 can include several separate data tables, databases or other data storage mechanisms and media for storing data relating to a particular aspect. For example, the data store illustrated includes mechanisms for storing content (e.g., production data) 1012 and user information 1016, which can be used to serve content for the production side. The data store is also shown to include a mechanism for storing log or session data 1014. It should be understood that there can be many other aspects that may need to be stored in the data store, such as page image information and access rights information, which can be stored in any of the above listed mechanisms as appropriate or in additional mechanisms in the data store 1010. The data store 1010 is operable, through logic associated therewith, to receive instructions from the application server 1008 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 1002. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the system 1000 in FIG. 10 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
    displaying a first state of a graphical interface element on a touch display of a computing device, the first state of the graphical interface element associated with a first function, the first function being associated with a skipping control for a media player application;
    detecting a first touch input based at least in part on contact with a first area of the touch display associated with the graphical interface element;
    causing execution of the first function;
    receiving an input, the input configured to convert the first state of the graphical interface element to a second state of the graphical interface element, the second state associated with a second function, the second function being associated with at least a track advance control for the media player application;

displaying the second state of the graphical interface element on the touch display;

detecting a second touch input based at least in part on a movement from the first area to a second area of the touch display associated with the graphical interface element, the second area associated with skipping from a current track over a first track to a second track, wherein the graphical interface element at least one of stretches or elongates in appearance based on the second touch input; and based on the movement, skipping from the current track over the first track to the second track by causing execution of the second function.

2. The computer-implemented method of claim 1, further comprising:

stretching the graphical interface element from the first area of the touch display to the second area.

3. The computer-implemented method of claim 1, wherein the input comprises contact with the first area of the touch display associated with the graphical interface element for a specified period of time.

4. The computer-implemented method of claim 1, wherein the first touch input comprises a finger contacting the first area of the touch display associated with the graphical interface element and maintaining contact with the touch display while moving laterally across the touch display.

5. A computing device, comprising:

a processor;

a touch display; and memory including instructions that, when executed by the processor, cause the computing device to:

display a first state of a graphical interface element on a touch display of a computing device, the first state of the graphical interface element associated with a first function, the first function being associated with a skipping control for a media player application;

detect a first touch input based at least in part on contact with a first area of the touch display associated with the graphical interface element;

causing execution of the first function;

receive an input, the input configured to convert the first state of the graphical interface element to a second state of the graphical interface element, the second state associated with a second function, the second function being associated with at least a track advance control for the media player application;

display the second state of the graphical interface element on the touch display;

detect a second touch input based at least in part on a movement from the first area to a second area of the touch display, the second area associated with skipping from a current track over a first track to a second track, wherein the graphical interface element at least one of stretches or elongates in appearance based on the second touch input; and based on the movement, skip from the current track over the first track to the second track by causing execution of the second function.

6. The computing device of claim 5, wherein the instructions when executed further cause the computing device to:

stretch the graphical interface element from the first area to the second area.

7. A non-transitory computer-readable storage medium storing instructions that, when executed by at least one processor, cause a computing device to:

display a first state of a graphical interface element on a touch display of a computing device, the first state of the graphical interface element associated with a first function, the first function being associated with creating at least one column for a spreadsheet application;

detect a first touch input based at least in part on contact with a first area of the touch display associated with the graphical interface element;

create a plurality of spreadsheet columns by executing the first function;

receive an input, the input including at least the contact with the first area of the touch display for a specified period of time, and configured to convert the first state of the graphical interface element to a second state of the graphical interface element, the second state associated with a second function, the second function being associated with creating at least one row for the spreadsheet application;

display the second state of the graphical interface element on the touch display;

detect a second touch input based at least in part on a movement from the first area to a second area of the touch display, wherein the graphical interface element at least one of stretches or elongates in appearance based on the second touch input; and based on the movement, create a plurality of spreadsheet rows by causing execution of the second function.

8. The non-transitory computer-readable storage medium of claim 7, wherein the instructions further cause the computing device to: stretch the graphical interface element from the first area to the second area.

* * * * *